United States Patent
Okubo et al.

(10) Patent No.: US 10,637,066 B2
(45) Date of Patent: Apr. 28, 2020

(54) CURRENT COLLECTOR PLATE ARRANGEMENT STRUCTURE OF BIPOLAR SOLID-STATE BATTERY

(71) Applicant: Honda Motor Co., Ltd., Tokyo (JP)

(72) Inventors: Sokichi Okubo, Saitama (JP); Hiroto Maeyama, Saitama (JP); Noriaki Kamaya, Saitama (JP); Ushio Harada, Saitama (JP); Toru Sukigara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/129,812

(22) Filed: Sep. 13, 2018

(65) Prior Publication Data
US 2019/0088952 A1 Mar. 21, 2019

(30) Foreign Application Priority Data
Sep. 13, 2017 (JP) .................... 2017-175641

(51) Int. Cl.
| | |
|---|---|
| *H01M 4/00* | (2006.01) |
| *H01M 4/70* | (2006.01) |
| *H01M 10/04* | (2006.01) |
| *H01M 10/0585* | (2010.01) |
| *H01M 10/0525* | (2010.01) |

(52) U.S. Cl.
CPC .......... *H01M 4/70* (2013.01); *H01M 10/0418* (2013.01); *H01M 10/0525* (2013.01); *H01M 10/0585* (2013.01)

(58) Field of Classification Search
CPC .. H01M 4/70; H01M 10/0418; H01M 10/025; H01M 10/0585
See application file for complete search history.

(56) References Cited

U.S. PATENT DOCUMENTS

2017/0117583 A1* 4/2017 Matsuno ........... H01M 10/0525

FOREIGN PATENT DOCUMENTS

| JP | 2015216077 | 12/2015 |
| JP | 2017045594 | 3/2017 |

* cited by examiner

*Primary Examiner* — Cynthia H Kelly
*Assistant Examiner* — Monique M Wills
(74) *Attorney, Agent, or Firm* — JCIPRNET

(57) ABSTRACT

The current collector plate arrangement structure of the bipolar solid-state battery includes a battery cell stack formed by stacking a plurality of solid-state battery cells each including a positive electrode active material layer, a negative electrode active material layer, and a solid electrolyte layer disposed between the positive electrode active material layer and the negative electrode active material layer and in contact with the positive electrode active material layer and the negative electrode active material layer. The bipolar solid-state battery includes a positive electrode current collector and a negative electrode current collector on a side surface with respect to a stacking direction. Current collector plates and of the solid-state battery cells are arranged on at least one of a front surface serving as one end surface in the stacking direction and a rear surface serving as the other end surface in the stacking direction.

3 Claims, 1 Drawing Sheet

CURRENT COLLECTOR PLATE ARRANGEMENT STRUCTURE OF BIPOLAR SOLID-STATE BATTERY

CROSS-REFERENCE TO RELATED APPLICATION

This application claims the priority benefit of Japan application serial no. 2017-175641, filed on Sep. 13, 2017. The entirety of the above-mentioned patent application is hereby incorporated by reference herein and made a part of this specification.

BACKGROUND

Technical Field

The disclosure relates to a current collector plate arrangement structure of a bipolar solid-state battery with improved energy density of solid-state battery cells.

Description of Related Art

Lithium batteries have been put to practical use as batteries having high voltage and high energy density. Due to the expansion of applications of lithium batteries to a wide field and the demand for high performance lithium batteries, various researches are being conducted to further improve the performance of lithium batteries.

The most effective way to improve the energy density of the lithium battery is to reduce the thickness of the electrode, and a bipolar battery formed by stacking a plurality of battery cells (see, for example, Patent Document 1: Japanese Laid-open No. 2017-045594), in which a positive electrode layer, an electrolyte layer, and a negative electrode layer are sequentially stacked to form one single cell, has been proposed (see, for example, Patent Document 2: Japanese Laid-open No. 2015-216077).

However, in the conventional bipolar battery, the current collector plates serving as the positive electrode and the negative electrode for monitoring and obtaining the voltage of the battery cells extend at the side surface of the battery cells, but the area of the side surface of the battery cells is limited. If more current collector plates are extended not only at one side surface of the battery cells but also at the other side surface, the area occupied by the current collector plates on the side surfaces of the cells becomes large.

SUMMARY

The disclosure provides a current collector plate arrangement structure of a bipolar solid-state battery (for example, the bipolar all-solid-state battery 1 which will be described later) including a battery cell stack (for example, the battery cell stack 10 which will be described later) formed by stacking a plurality of solid-state battery cells (for example, the all-solid-state battery cells 20 which will be described later), each of the plurality of solid-state battery cells including a positive electrode active material layer (for example, the positive electrode composite material 21 which will be described later), a negative electrode active material layer (for example, the negative electrode composite material 22 which will be described later), and a solid electrolyte layer (for example, the solid electrolyte layer 23 which will be described later) disposed between the positive electrode active material layer and the negative electrode active material layer and in contact with the positive electrode active material layer and the negative electrode active material layer respectively. A positive electrode current collector (for example, the positive electrode current collector 11 which will be described later) and a negative electrode current collector (for example, the negative electrode current collector 12 which will be described later) are provided on a side surface (for example, the side surface 101 which will be described later) with respect to a stacking direction, and a current collector plate of the solid-state battery cells is disposed on at least one of a front surface (for example, the upper surface 102 which will be described later) that serves as one end surface in the stacking direction and a rear surface (for example, the lower surface 103 which will be described later) that serves as the other end surface in the stacking direction.

DESCRIPTION OF THE EMBODIMENTS

Figure 1:
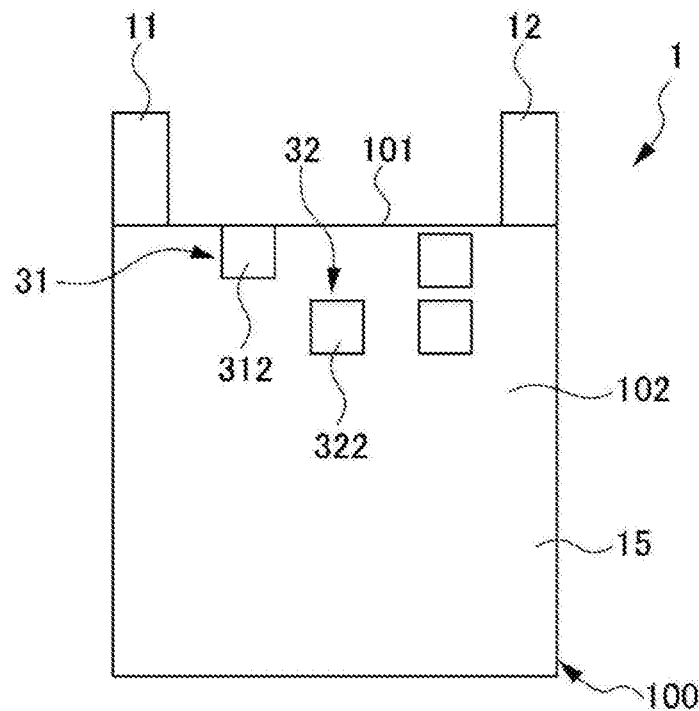
FIG. 1 is a plan view showing a current collector plate arrangement structure of a bipolar solid-state battery according to an embodiment of the disclosure.

In view of the above, the disclosure provides a current collector plate arrangement structure of a bipolar solid-state battery, in which a plurality of current collector plates for obtaining the voltage of the battery cells can be arranged outside the bipolar solid-state battery while the occupied area is prevented from increasing.

The disclosure provides a current collector plate arrangement structure of a bipolar solid-state battery (for example, the bipolar all-solid-state battery 1 which will be described later) including a battery cell stack (for example, the battery cell stack 10 which will be described later) formed by stacking a plurality of solid-state battery cells (for example, the all-solid-state battery cells 20 which will be described later), each of the plurality of solid-state battery cells including a positive electrode active material layer (for example, the positive electrode composite material 21 which will be described later), a negative electrode active material layer (for example, the negative electrode composite material 22 which will be described later), and a solid electrolyte layer (for example, the solid electrolyte layer 23 which will be described later) disposed between the positive electrode active material layer and the negative electrode active material layer and in contact with the positive electrode active material layer and the negative electrode active material layer respectively. A positive electrode current collector (for example, the positive electrode current collector 11 which will be described later) and a negative electrode current collector (for example, the negative electrode current collector 12 which will be described later) are provided on a side surface (for example, the side surface 101 which will be described later) with respect to a stacking direction, and a current collector plate of the solid-state battery cells is disposed on at least one of a front surface (for example, the upper surface 102 which will be described later) that serves as one end surface in the stacking direction and a rear surface (for example, the lower surface 103 which will be described later) that serves as the other end surface in the stacking direction.

In the disclosure, the current collector plate of the solid-state battery cells is arranged on at least one of the front surface that serves as one end surface in the stacking direction and the rear surface that serves as the other end surface in the stacking direction. Therefore, compared to placing the current collector plate on the side surface of the bipolar solid-state battery, the disclosure makes it possible to reduce the area occupied by the current collector plate on the side surface and to reduce the occupied volume of the current collector plate in the entire bipolar solid-state battery. As a result, energy density can be improved.

Also, with such an arrangement, the current collector plate is structurally reinforced by the surface of the bipolar solid-state battery. Therefore, it is possible to reduce the size of the current collector plate without increasing its size, and it is possible to improve the energy density.

According to an embodiment, the current collector plate extends in the stacking direction of the solid-state battery cells between the battery cell stack and a side wall (for example, the side wall sealing material 17 which will be described later) forming a side surface of the bipolar solid-state battery, and is disposed on at least one of the front surface and the rear surface.

In the disclosure, the current collector plate extends in the stacking direction of the solid-state battery cells between the battery cell stack and the side wall forming the side surface of the bipolar solid-state battery. As a result, the current collector plate does not protrude from the side surface of the bipolar solid-state battery to the outside of the bipolar solid-state battery but is arranged on the upper surface of the bipolar solid-state battery. Therefore, it is possible to reduce the occupied volume of the current collector plate in the entire bipolar solid-state battery.

According to an embodiment, the current collector plates of all the solid-state battery cells are arranged on either the front surface or the rear surface.

In the disclosure, the current collector plates of all the solid-state battery cells are arranged on either the front surface or the rear surface, which makes it easy to electrically connect a voltage measuring instrument to the positive-electrode and negative-electrode current collector plates for obtaining the voltage of the solid-state battery cells on the surface of the bipolar solid-state battery.

The disclosure provides a current collector plate arrangement structure of a bipolar solid-state battery that makes it possible to arrange a plurality of current collector plates for obtaining the voltage of the battery cells outside the bipolar solid-state battery while preventing the occupied area from increasing.

Figure 2:
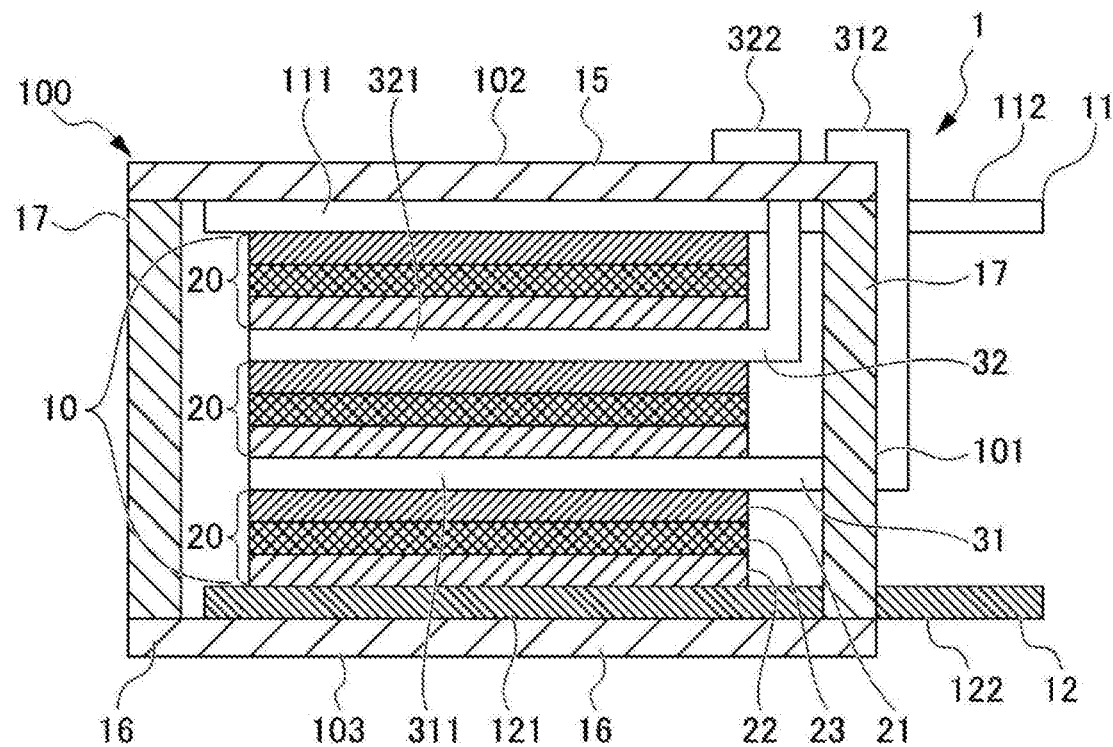
FIG. 2 is a side sectional view showing the current collector plate arrangement structure of the bipolar solid-state battery according to the embodiment.

Hereinafter, an embodiment of the disclosure will be described in detail with reference to the drawings. FIG. 1 is a plan view showing a current collector plate arrangement structure of a bipolar solid-state battery according to an embodiment of the disclosure. FIG. 2 is a side sectional view showing the current collector plate arrangement structure of the bipolar solid-state battery. In FIG. 2, for convenience of explanation, illustration of voltage monitoring terminals, other than voltage monitoring terminals 31 and 32 indicated by reference numerals "31" and "32" in FIG. 1, is omitted.

The bipolar solid-state battery is constituted by a bipolar all-solid-state battery 1 having a bipolar structure including a battery cell stack 10 formed by stacking a plurality of all-solid-state battery cells 20. The current collector plate arrangement structure of the bipolar solid-state battery in the present embodiment relates to the arrangement of the voltage monitoring terminals 31 and 32 that serve as current collector plates for monitoring and obtaining the voltages of the all-solid-state battery cells 20 in the bipolar all-solid-state battery 1.

More specifically, the all-solid-state battery cell 20 forming the bipolar all-solid-state battery 1 includes a positive electrode composite material 21 as a positive electrode layer formed of a solid positive electrode active material and functioning as a positive electrode, a negative electrode composite material 22 as a negative electrode layer formed of a solid negative electrode active material and functioning as a negative electrode, and a solid electrolyte layer 23 disposed between the positive electrode composite material 21 and the negative electrode composite material 22. The positive electrode composite material 21, the solid electrolyte layer 23, and the negative electrode composite material 22 are stacked, with the positive electrode composite material 21 and the solid electrolyte layer 23 being in contact with each other, and the negative electrode composite material 22 and the solid electrolyte layer 23 being in contact with each other.

A plurality of all-solid-state battery cells 20 are stacked via the plate-shaped voltage monitoring terminals 31 and 32 that serve as the current collector plates. Specifically, as shown in FIG. 2, the negative electrode composite material 22 of the lowermost all-solid-state battery cell 20 is placed on a negative electrode current collector 12 that serves as the negative electrode of the bipolar all-solid-state battery 1 and is in contact with the negative electrode current collector 12. Then, in the lowermost all-solid-state battery cell 20, the negative electrode composite material 22, the solid electrolyte layer 23, and the positive electrode composite material 21 are sequentially stacked in this order, and one end part 311 of the voltage monitoring terminal 31 is placed on and in contact with the positive electrode composite material 21.

The negative electrode composite material 22 of the second lowermost all-solid-state battery cell 20 of the voltage monitoring terminal 31 is placed on the one end part 311 and is in contact with the one end part 311 of the voltage monitoring terminal 31. Then, in the second lowermost all-solid-state battery cell 20, as in the lowermost all-solid-state battery cell 20, the negative electrode composite material 22, the solid electrolyte layer 23, and the positive electrode composite material 21 are sequentially stacked in this order, and one end part 321 of the voltage monitoring terminal 32 is placed on and in contact with the positive electrode composite material 21.

The negative electrode composite material 22 of the uppermost all-solid-state battery cell 20 is placed on the one end part 321 of the voltage monitoring terminal 32 and is in contact with the one end part 321 of the voltage monitoring terminal 32. Then, in the uppermost all-solid-state battery cell 20, as in the lowermost all-solid-state battery cell 20, the negative electrode composite material 22, the solid electrolyte layer 23, and the positive electrode composite material 21 are sequentially stacked in this order, and one end part 111 of the positive electrode current collector 11 is placed on and in contact with the positive electrode composite material 21.

The plurality of all-solid-state battery cells 20 stacked in this manner are housed inside an outer part 100 composed of an upper wall exterior material 15, a lower wall exterior material 16, and a side wall sealing material 17. The upper wall exterior material 15 has an upper surface 102 that serves as one end surface in the stacking direction of the all-solid-state battery cells 20. The lower wall exterior material 16 has a lower surface 103 that serves as the other end surface in the same direction. The side wall sealing material 17 having a side surface 101 of the bipolar all-solid-state battery 1 is provided to straddle the upper wall exterior material 15 and the lower wall exterior material 16.

One end part 121 of the negative electrode current collector 12 is placed on the upper surface of the lower wall exterior material 16, and the other end part 122 of the negative electrode current collector 12 penetrates the side wall sealing material 17 and extends to the outside of the side surface 101. The one end part 111 of the positive electrode current collector 11 is placed on the lower surface of the upper wall exterior material 15, and the other end part 112 of the positive electrode current collector 11 penetrates the side wall sealing material 17 and extends to the outside of the side surface 101 of the outer part 100.

The voltage monitoring terminal 31 arranged between the lowermost all-solid-state battery cell 20 and the second lowermost all-solid-state battery cell 20 penetrates the side wall sealing material 17 and extends to the outside of the side surface 101 and is bent to extend upward along the outer surface (the side surface 101) of the side wall sealing material 17 to the upper surface 102 (the upper surface 102 of the outer part 100) of the upper wall exterior material 15. The other end part 312 of the voltage monitoring terminal 31 is bent and arranged along the upper surface 102 of the upper wall exterior material 15 to be disposed on the upper surface 102. The other end part 312 of the voltage monitoring terminal 31 provided on the upper surface 102 of the upper wall exterior material 15 is formed in a square flat plate shape as shown in FIG. 1.

The voltage monitoring terminal 32 arranged between the uppermost all-solid-state battery cell 20 and the second lowermost all-solid-state battery cell 20 is bent and extends upward along the inner surface of the side wall sealing material 17. That is, the voltage monitoring terminal 32 extends in the stacking direction of the all-solid-state battery cells 20 between the battery cell stack 10 formed by the stacked all-solid-state battery cells 20 and the side wall sealing material 17 forming the side surface 101 of the bipolar all-solid-state battery 1, penetrates the upper wall exterior material 15, and reaches the upper surface 102 of the upper wall exterior material 15. The other end part 322 of the voltage monitoring terminal 32 is bent and arranged along the upper surface 102 of the upper wall exterior material 15 to be disposed on the upper surface 102. The other end part 322 of the voltage monitoring terminal 32 provided on the upper surface 102 of the upper wall exterior material 15 is formed in a square flat plate shape as shown in FIG. 1.

Therefore, the other end part 322 of the voltage monitoring terminal 32 and the other end part 312 of the voltage monitoring terminal 31 are both arranged on the upper surface 102 (the front surface) of the upper wall exterior material 15 but are not arranged on the lower surface 103 (the rear surface) of the lower wall exterior material 16 or the outer surface (the side surface 101) of the side wall sealing material 17.

According to the present embodiment, the following effects are obtained. In the present embodiment, the other end part 322 of the voltage monitoring terminal 32 and the other end part 312 of the voltage monitoring terminal 31 that serve as the current collector plates of the all-solid-state battery cells 20 are arranged on the upper surface 102 that serves as one end surface of the bipolar all-solid-state battery 1 in the stacking direction of the all-solid-state battery cells 20.

Compared with the case where the voltage monitoring terminals that serve as the current collector plates are placed on the side surface of the bipolar all-solid-state battery, the disclosure makes it possible to reduce the area occupied on the side surface and reduce the occupied volume of the voltage monitoring terminals 31 and 32 in the entire bipolar all-solid-state battery 1. As a result, energy density can be improved.

With such an arrangement, the other end part 322 of the voltage monitoring terminal 32 and the other end part 312 of the voltage monitoring terminal 31 are structurally reinforced by the upper surface 102 of the bipolar all-solid-state battery 1. For this reason, it is possible to reduce the sizes of the voltage monitoring terminal 32 and the voltage monitoring terminal 31 without increasing their sizes, and it is possible to improve the energy density.

Also, the voltage monitoring terminal 32 that serves as the current collector plate extends in the stacking direction of the all-solid-state battery cells 20 between the battery cell stack 10 and the side wall sealing material 17, which forms the side surface 101 of the bipolar all-solid-state battery 1, and is arranged on the front surface 102.

As a result, since the voltage monitoring terminals 31 and 32 do not protrude from the side surface 101 of the bipolar all-solid-state battery 1 to the outside of the outer part 100 but are arranged on the upper surface 102 of the bipolar all-solid-state battery 1, it is possible to reduce the occupied volume of the voltage monitoring terminals 31 and 32 in the entire bipolar all-solid-state battery 1.

Also, the other end part 322 of the voltage monitoring terminal 32 and the other end part 312 of the voltage monitoring terminal 31 that serve as the current collector plates of all of the all-solid-state battery cells 20 are arranged on the upper surface 102 (the front surface) of the bipolar solid-state battery. Thereby, it is possible to electrically connect a voltage measuring instrument easily to the voltage monitoring terminal 32 and the voltage monitoring terminal 31, which are positive-electrode and negative-electrode current collector plates for obtaining the voltage of the all-solid-state battery cells 20, on the upper surface 102 (the front surface) of the upper wall exterior material 15.

It should be noted that the disclosure is not limited to the above embodiment, and variations, improvements, etc. within the scope of achieving the objective of the disclosure are included in the disclosure.

For example, in the above embodiment, the other end part 322 of the voltage monitoring terminal 32 and the other end part 312 of the voltage monitoring terminal 31 are arranged on the upper surface 102 (the front surface) that serves as one end surface in the stacking direction of the all-solid-state battery cells 20, but they are not limited to this configuration. For example, the other end parts 322 and 312 of the voltage monitoring terminal 32 and the voltage monitoring terminal 31 that serve as the current collector plates may also be arranged on the lower surface 103 (the rear surface) that serves as the other end surface in the stacking direction of the all-solid-state battery cells 20. Also, if necessary, for example, the voltage monitoring terminals that serve as the current collector plates of the all-solid-state battery cells may be arranged on at least one of the upper surface 102 (the front surface) that serves as one end surface in the stacking direction of the all-solid-state battery cells 20 and the lower surface 103 (the rear surface) that serves as the other end surface in the same direction. That is, for example, the other end part 322 of the voltage monitoring terminal 32 may be arranged on the upper surface 102 (the front surface) that serves as one end surface in the stacking direction of the all-solid-state battery cells 20 and the other end part 312 of the voltage monitoring terminal 31 may be arranged on the lower surface 103 (the rear surface) that serves as the other end surface in the stacking direction of the all-solid-state battery cells 20.

The configuration of each component of the current collector plate arrangement structure of the bipolar solid-state battery is not limited to the configuration of each component of the current collector plate arrangement structure of the bipolar all-solid-state battery 1 according to the present embodiment. For example, the other end part 322 of the voltage monitoring terminal 32 and the other end part 312 of the voltage monitoring terminal 31 that serve as the current collector plates are formed in a square flat plate shape, but the shape is not limited thereto. For example, the current collector plates may also be formed in the shape of a line. Further, for example, the bipolar solid-state battery may also be constituted by a bipolar all-solid-state battery 1 including all-solid-state battery cells 20, in which terminals for applying a current to the all-solid-state battery cells 20 are located on the outer surface of the outer part 100.

In the bipolar all-solid-state battery 1 in the present embodiment, the voltage monitoring terminal 31 penetrates the side wall sealing material 17 and extends to the outside of the outer part 100, and the voltage monitoring terminal 32 penetrates the upper wall exterior material 15 and extends to the outside of the outer part 100, but they are not limited to this configuration. For example, both of the voltage monitoring terminals may have a configuration of penetrating the upper wall exterior material 15 or the lower wall exterior material 16 and extending to the outside of the outer part 100.

Further, in the present embodiment, the bipolar solid-state battery is configured with a bipolar all-solid-state battery 1 but is not limited thereto. For example, the bipolar solid-state battery may also be constituted by a liquid-based lithium ion secondary battery having a liquid electrolyte. In addition, it is also possible that the bipolar all-solid-state battery 1 does not have a lithium alloy.

What is claimed is:

1. A current collector plate arrangement structure of a bipolar solid-state battery comprising a battery cell stack formed by stacking a plurality of solid-state battery cells, each of the plurality of solid-state battery cells comprising a positive electrode active material layer, a negative electrode active material layer, and a solid electrolyte layer disposed between the positive electrode active material layer and the negative electrode active material layer and in contact with the positive electrode active material layer and the negative electrode active material layer respectively, wherein a positive electrode current collector and a negative electrode current collector are provided on a side surface with respect to a stacking direction, the plurality of solid-state battery cells stacked in the stacking direction are housed inside an outer part having an upper wall exterior material and a lower wall exterior material, and a current collector plate of the solid-state battery cells has a first terminal and a second terminal, an end part of the first terminal is disposed on at least one of a front surface of the upper wall exterior material that serves as one end surface in the stacking direction and a rear surface of the lower wall exterior material that serves as the other end surface in the stacking direction, and an end part of the second terminal is disposed on at least one of the front surface and the rear surface.

2. The current collector plate arrangement structure of the bipolar solid-state battery according to claim 1, wherein the current collector plate extends in the stacking direction of the solid-state battery cells between the battery cell stack and a side wall forming a side surface of the bipolar solid-state battery, and is disposed on at least one of the front surface and the rear surface.

3. The current collector plate arrangement structure of the bipolar solid-state battery according to claim 1, wherein the current collector plates of all the solid-state battery cells are arranged on either the front surface or the rear surface.

* * * * *